United States Patent [19]
Gohres et al.

[11] Patent Number: 5,992,901
[45] Date of Patent: Nov. 30, 1999

[54] DEVICE FOR COUPLING A COOLANT DUCT OF A ROTATING PART

[75] Inventors: Hans-Werner Gohres, Duisburg; Franz-Josef Divjak, Rheinberg; Rainer Lenk, Duisburg, all of Germany

[73] Assignee: Mannesmann AG, Düsseldorf, Germany

[21] Appl. No.: 09/066,295

[22] PCT Filed: Oct. 27, 1995

[86] PCT No.: PCT/DE96/02026

§ 371 Date: Apr. 27, 1998

§ 102(e) Date: Apr. 27, 1998

[87] PCT Pub. No.: WO97/15763

PCT Pub. Date: May 1, 1997

[30] Foreign Application Priority Data

Oct. 27, 1995 [DE] Germany ............................ 195 41 131

[51] Int. Cl.[6] .................................................... F16L 27/00
[52] U.S. Cl. .................. 285/121.2; 285/279; 285/121.4; 277/379
[58] Field of Search .................................. 285/FOR 102, 285/FOR 115, FOR 117, 278, 279, 121.2, 121.4, 121.5, 121.3

[56] References Cited

U.S. PATENT DOCUMENTS

| | | | |
|---|---|---|---|
| 1,586,725 | 6/1926 | Westinghouse et al. | 285/279 |
| 2,673,748 | 3/1954 | Shaw | 285/121.4 |
| 2,794,659 | 6/1957 | Bily | 285/121.4 |
| 3,501,174 | 3/1970 | Walker | 285/279 |
| 4,477,088 | 10/1984 | Picard | 277/379 |
| 5,011,166 | 4/1991 | Watts | 277/379 |

FOREIGN PATENT DOCUMENTS

| | | | |
|---|---|---|---|
| 559895 | 7/1958 | Canada | 285/FOR 115 |
| 660353 | 4/1963 | Canada | 285/FOR 115 |
| 830157 | 7/1938 | France | 285/279 |
| 900512 | 7/1945 | France | 285/FOR 115 |
| 728431 | 4/1955 | United Kingdom | 285/FOR 115 |
| 958505 | 5/1964 | United Kingdom | 285/FOR 115 |

*Primary Examiner*—Eric K Nicholson
*Attorney, Agent, or Firm*—Cohen, Pontani, Lieberman & Pavane

[57] ABSTRACT

A device for coupling a coolant duct of a rotating part, especially for a back-up or transport rollers, includes a hollow resilient compensator device fixedly connected to a journal of the rotating part, wherein the journal comprises a bore hole for conducting a coolant and is insertable in a bearing of a stationary part. A second end of the compensator is connected to a first sealing ring. The compensator is enclosed by a receptacle sleeve which includes a second sealing ring that creates a sealin contact with the first sealing ring. The receptacle is connected to the stationary part at an adjustable distance wherein a pretensioning exerted on the compensator by the receptacle sleeve via the first and second sealing rings is adjustable in response to a distance of the receptacle sleeve from the stationary part.

9 Claims, 6 Drawing Sheets

DEVICE FOR COUPLING A COOLANT DUCT OF A ROTATING PART

BACKGROUND OF THE INVENTION

1. Field of the Invention

The invention relates is directed to a device for coupling the coolant duct of a rotating part.

2. Description of the Prior Art

Reference DE-PS 42 07 042 discloses a generic device for coupling the coolant duct of a back-up and transporting roll. This device is supported by pins in bearing blocks or pillow blocks by roller bearings, and coolant flows through the device along an axial bore hole that is guided through the pins. Every bearing block is closed by a cover. The cover has a cooling duct which is connected at one end to a coolant inlet and coolant outlet, respectively. The other end opens into the region of the pin bore hole. A compensator is arranged between the duct opening of the cover and the bore hole of the roll and cooperates with a seal which coaxially contacts a sealing face arranged relative to the roll shaft. The seal is preferably constructed as a lip seal.

It is disadvantageous in this construction that the sealing lip of the sealing ring is subject to wear because of the movement occurring on it and therefore has a limited life. Further, the attainable temperature range is limited because lip sealing rings are usually made from elastomers. Moreover, the compensator cannot be pretensioned in a deliberate manner, so that it is not possible to adapt to different internal pressures of the coolant.

SUMMARY OF THE INVENTION

It is the object of the invention to provide a long-lasting device of the generic type by which the described disadvantages of the prior art are avoided. This object is met by a device for coupling the coolant duct of a rotating part which is rotatably supported in a bearing by a journal. The journal is connected to a cooling duct which connects a bore hole through the journal to an inlet or an outlet for the coolant. A resilient compensator is arranged between the coolant inlet or outlet and the bore hole of the journal to prevent motion between the journal and stationary parts. The end of the compensator facing the journal is rotatably fixed by connection to the journal. The end of the compensator that is remote from the rotating part is rotatably fixed to a sliding ring of a sliding ring seal. A stationary sliding ring of the sliding ring seal is supported on a receptacle sleeve which is detachably connected to the frame part and encloses the compensator. The position of the receptacle sleeve with respect to the journal is changeable to suitably pretension the compensator.

This object is met by the features indicated in the characterizing part of claim 1. Advantageous further developments are contained in the subclaims.

The advantage of the suggested construction consists in that the range of use can be considerably increased through the use of an axially acting sliding ring seal. The temperature limitation which was formerly customary due to the use of an elastomer for the lip seal is eliminated in this case. The service life of the device is significantly extended, since the rate of wear of a sliding ring seal is substantially lower than that of a lip seal. The hard, wear-resistant material used for the sliding ring seal, e.g., silicon carbide, is capable of pulverizing particles of dirt that may be carried along by the coolant. The arrangement of the compensator together with the sliding ring seal in a receptacle sleeve enables the pretensioning by varying the distance of the cover-like flange from the frame element of the bearing of the rotating part. This varying of pretensioning is used advantageously to adapt the action of the internal pressure of the coolant to the action of the compensator.

The suggested device may be adapted for use in both high-speed and low-speed rolls, rollers or the like, by the choice of material as well as by the size of the sealing surface of the sliding ring seal. Possible leakage of the coolant in the area of the sliding ring seal is easily be removed through an opening arranged, for example, in the cover-like flange. This prevents the undesirable mixing of the coolant with the lubricant for the bearing. In many cases, it is also desirable in the event of damage to the seal to remove the coolant at a defined location in a controlled manner to avoid wetting the product produced in the installation.

The newly developed construction is also usable for rotating parts in which one side is not available for a cooling connection, for example, because of the connection of a drive unit. In this case, the dual principle is applied, wherein both the feed and discharge of the selected coolant are carried out from one side. For this purpose, a pipe is arranged in the bore hole of the rotating part, wherein the outer diameter of the pipe is smaller than the inner diameter of the bore hole. This pipe extends through the compensator and the sliding ring seal and is connected with an inlet and outlet connection arranged in the receptacle sleeve.

DESCRIPTION OF THE DRAWINGS

In the drawing, wherein like reference characters denot similar elements throughout the several views.

DETAILED DESCRIPTION OF THE PREFERRED EMBODIMENTS

Figure 1:
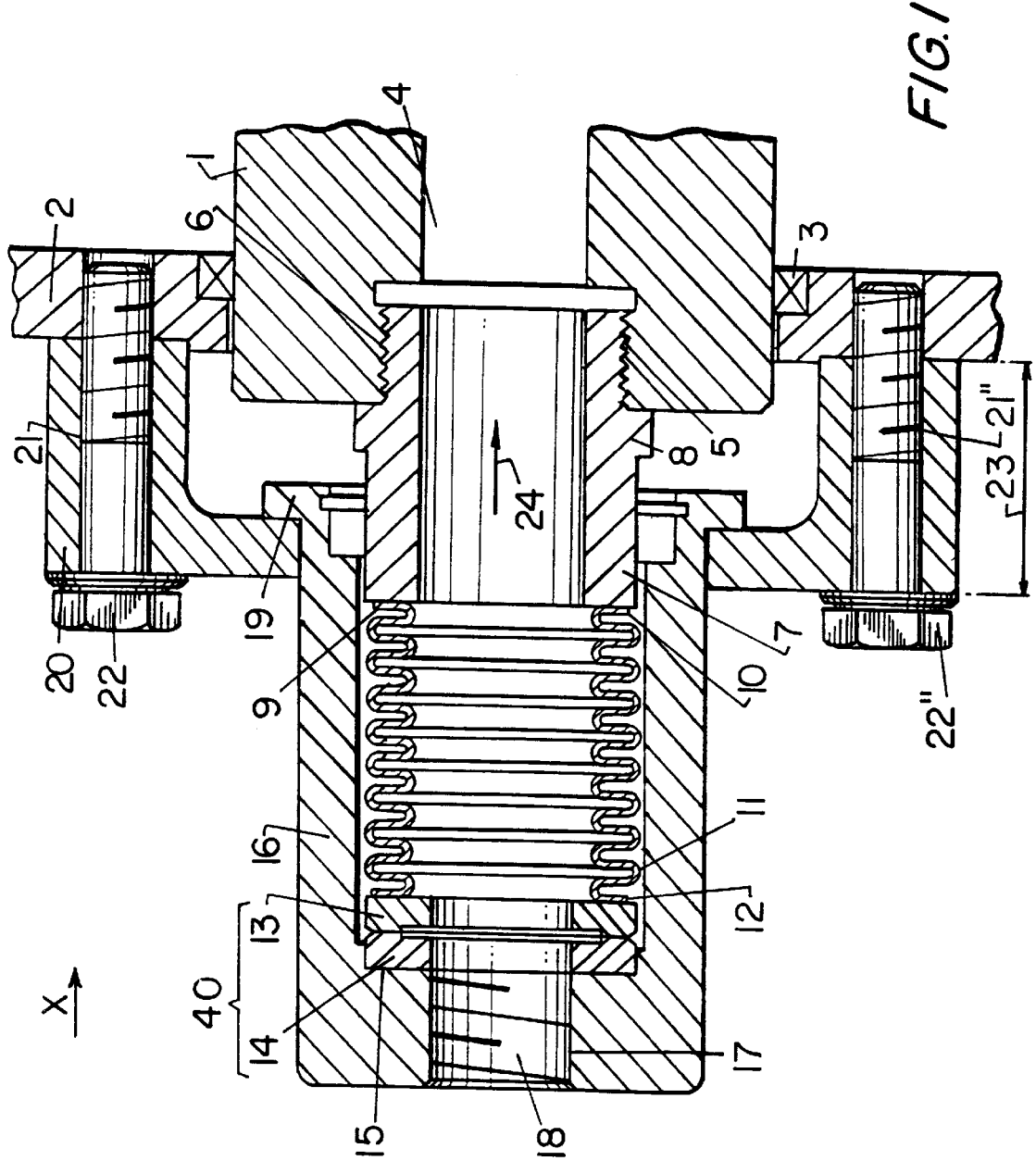
FIG. 1 shows a partial longitudinal section through a first embodiment form of the device according to the invention.
Figure 2:
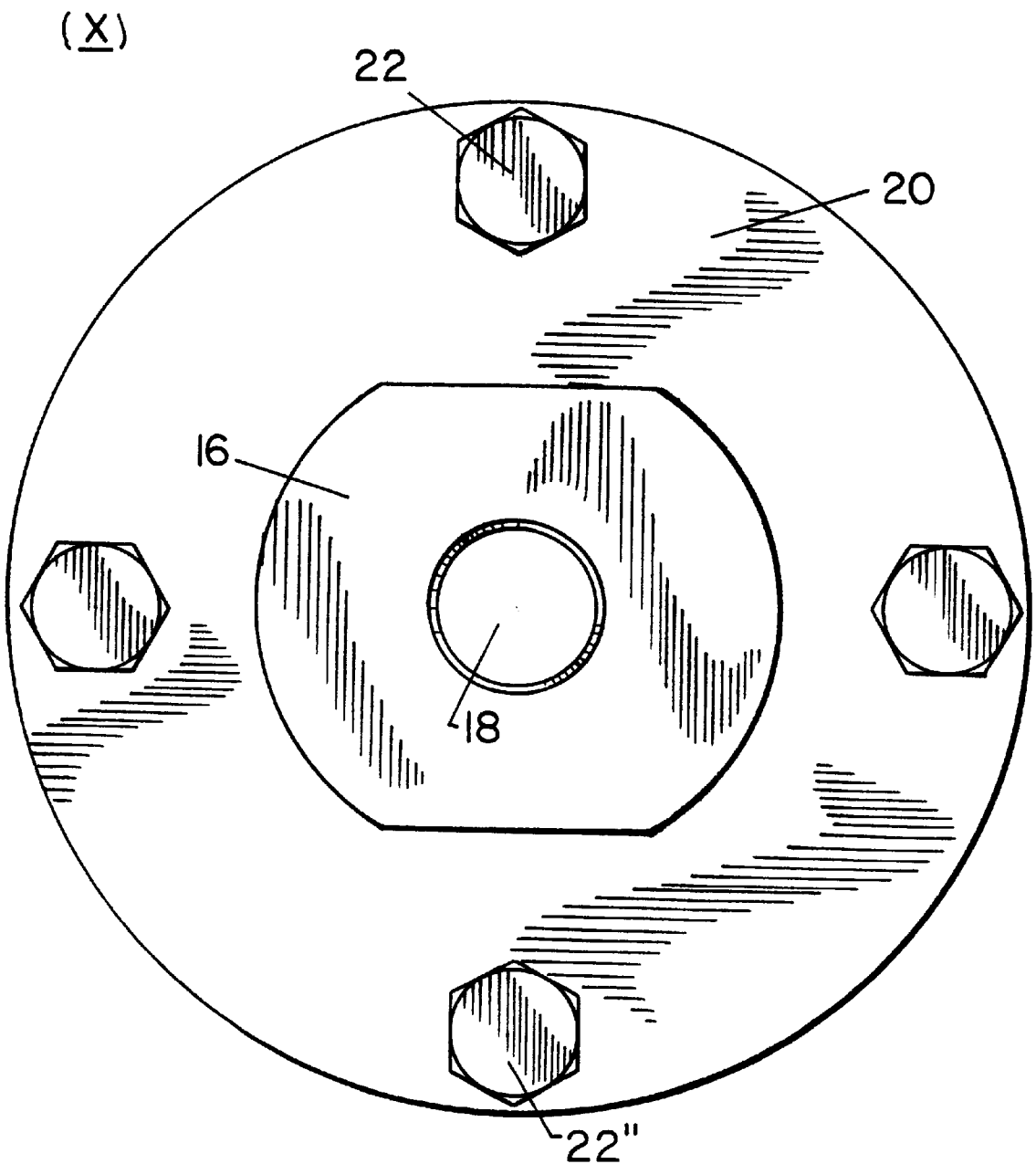
FIG. 2 shows the device of FIG. 1 as viewed in direction X from FIG. 1.

A first embodiment form of the device according to the invention is shown in FIG. 1 in partial longitudinal section and in FIG. 2 in a view in direction X of FIG. 1. The end region of a journal 1 of a rotating part, not shown in more detail, is covered by a frame part 2 of a bearing, not shown more fully, with a seal 3 positioned between the frame part 2 and journal 1. The journal 1 has an axially extending bore hole 4 through which the coolant is guided. A recess 5 is arranged centrally in the end area of the journal 1. Collar sleeve 7 having a threaded portion 6 is screwed into the recess 5. The collar sleeve 7 has a collar-shaped neck 8 serving as a stop. This collar-shaped neck 8 is preferably provided with two flattened portions (not shown), so that a suitable wrench may be applied for tightening the collar sleeve 7. Instead of collar sleeve 7, a flange mounted sleeve may also be used. A first end 10 of a compensator 11 facing the frame part 2 is attached, for example, by means of a weld, to a front end 9 of the collar sleeve 7 so that the compensator 11 is fixed with respect to rotation relative to the collar sleeve 7. A second end 12 of the compensator 11 is connected with a sliding ring 13 of a sliding ring seal 40 so as to be fixed with respect to rotation relative to the compensator 11, for example, by a weld. A stationary sliding ring 14 of the sliding ring seal 40 is arranged on a base-like shoulder 15 of a receptacle sleeve 16 so that the stationary sliding ring 14 is fixed with respect to rotation relative to the receptacle sleeve 16, for example, by friction setting or by being pressed into the base-like shoulder The sliding rings 13, 14 of the sliding ring seal 40 are preferably made of silicon carbide and are accordingly hard and resistant to wear. In FIG. 1, the receptacle sleeve 16 has a bore hole 18 provided with a threaded portion 17. A corresponding coolant line can be screwed into this threaded portion 17. Of course, this connection can also be designed differently without departing in any way from the essence of the invention. At the end facing the rotating part, the receptacle sleeve 16 has a neck 19 extending radially outward. A cover 20 rests on this neck 19. In this embodiment example, the cover 20 has four bore holes 21, 21', 21", 21'" through which connection screws 22, 22', 22", 22'" can be inserted. The cover 20 is fastened to the frame part 2 by the screws 22 to 22'". The smaller the selected thickness 23 of the cover 20, the higher the pretensioning of the compensator 11 enclosed by the receptacle sleeve 16. The pretensioning can be reduced by arranging spacers such as washers, (not shown) between the cover 20 and the frame part 2. In FIG. the coolant flows through the device from left to right, for example, as shown by arrow 24. The coolant also flows through the compensator 11 which is acted upon by the internal pressure of the coolant. The allotted pretensioning of the compensator 11 and the internal pressure of the coolant work together in such a way that the force required for the sealing effect is achieved.

Figure 3:
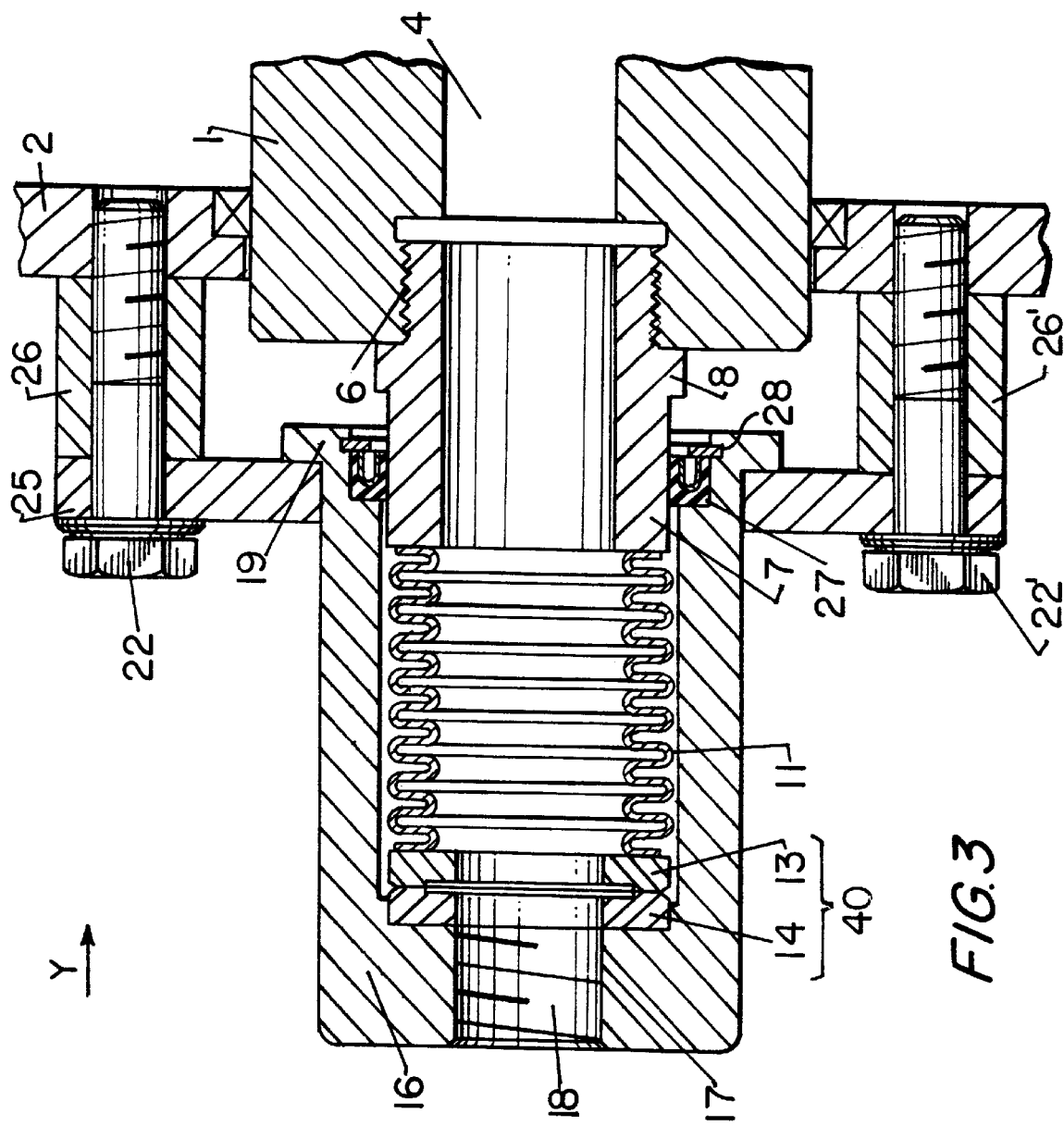
FIG. 3 shows a partial longitudinal section of a second embodiment form of the device according to the invention
Figure 4:
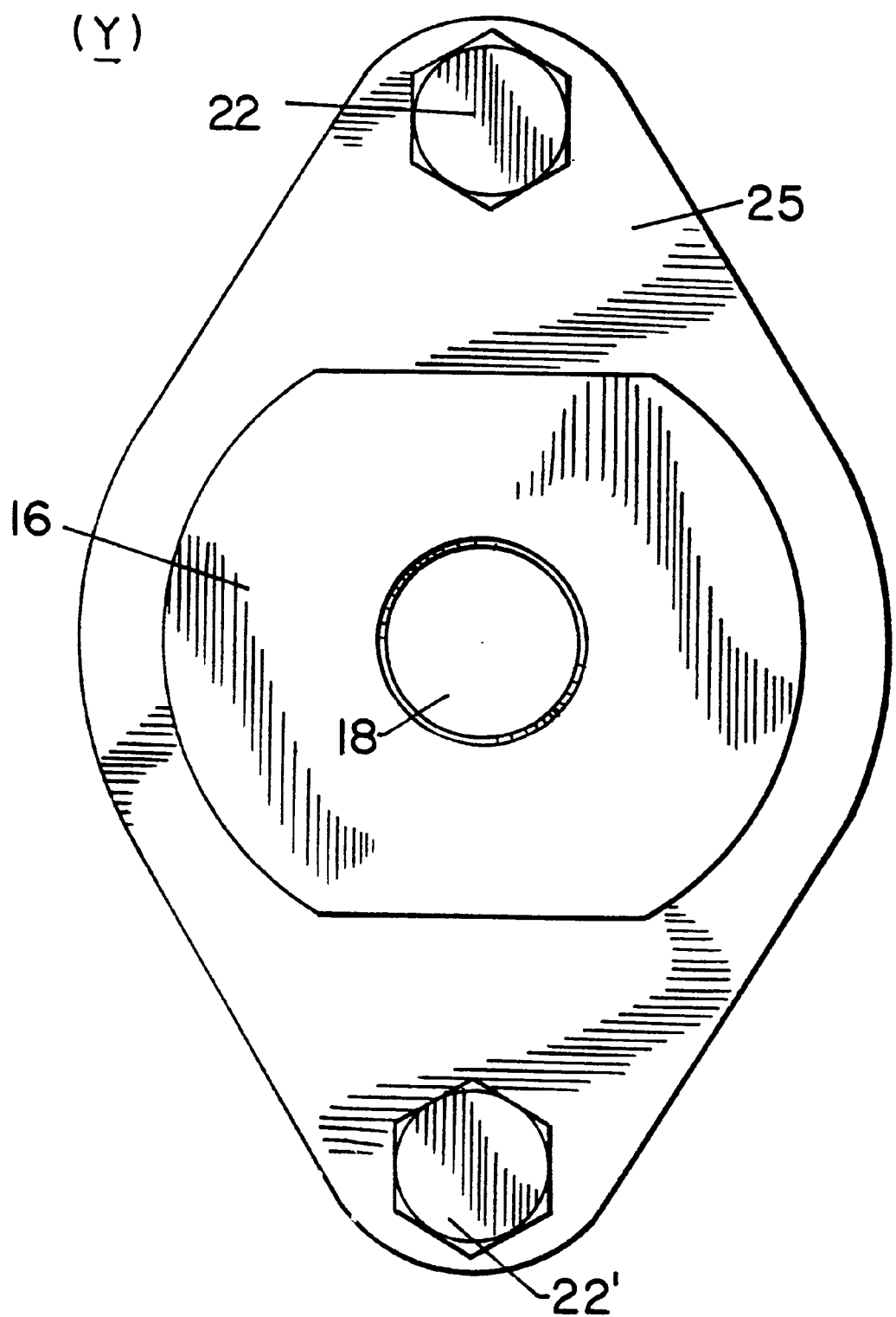
FIG. 4 shows the device of FIG. 3 as viewed in direction Y of FIG. 3.

FIGS. 3 and 4 show a second embodiment form of the device according to the invention in the same partial longitudinal section and view as in FIG. 1 and FIG. 2, respectively, wherein the same reference numbers have been used for identical parts. In contrast to FIG. 1, a plate 25 having two bore holes 21 & 21' and which cooperates with the neck 19 of the receptacle sleeve 16 is used instead of the cover 20. The distance affecting the pretensioning of the compensator 11 is adjusted in this example by means of the spacer sleeves 26, 26' enclosing the connection screws 22, 22' which are inserted though the two bore holes 21 & 21'. Since the space between the plate 25 and journal 1 is adjustable in this case, a seal 27 is arranged between the collar sleeve 8 and the receptacle sleeve 16 and is secured by a snap ring 28. If a drainage opening is required in this embodiment, it may be arranged in the cylindrical part of the receptacle sleeve 16.

Figure 5:
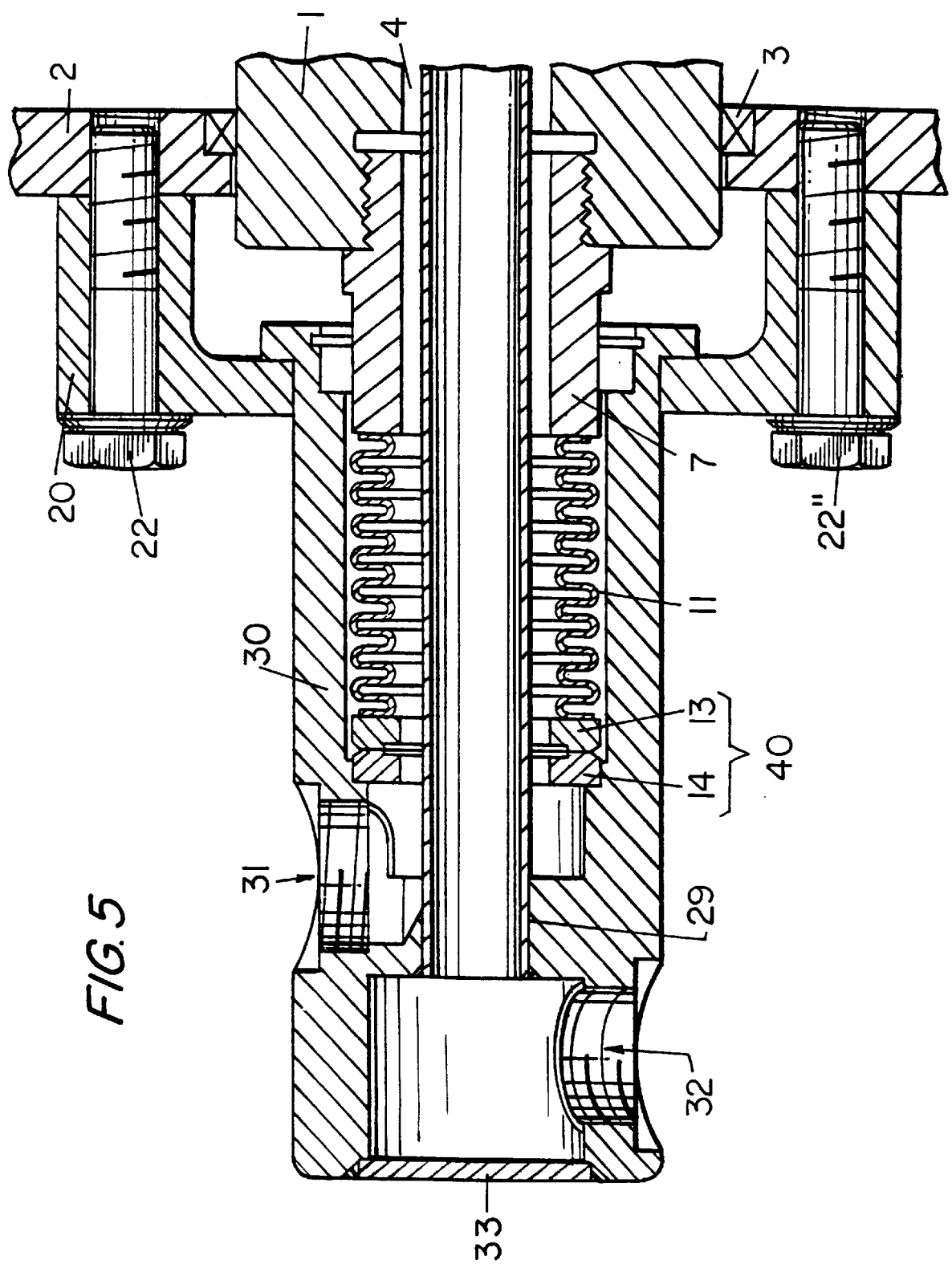
FIG. 5 shows a third embodiment form of the device according to the invention in longitudinal section comparable to FIG. 1.

FIG. 5 shows another embodiment example in the same partial longitudinal section as FIG. 1. In this case also, identical parts are provided with the same reference numbers. This embodiment form is required when the other side of the rotating part, (not shown) can not accommodate a coolant connection because, for example, the drive for the rotation of the rotating part is attached on this side. In this embodiment, a pipe 29 which has an outer diameter smaller than the inner diameter of the bore hole 4 of the journal 1 is arranged in the bore hole 4 of the pin 1. This pipe 29 extends through the collar sleeve 7, the compensator 11, and the sliding ring seal 40 and is fastened in a differently designed receptacle sleeve 30. This receptacle sleeve 30 differs from that shown in FIG. 1 in that it has an inlet connection 31 and an outlet connection 32. The two connections 31, 32 may exchange functions. The open end of the receptacle sleeve 30 is closed by a cover 33. The effect of the sliding ring seal 40 in composite action with the compensator 11 is the same as was described above.

Figure 6:
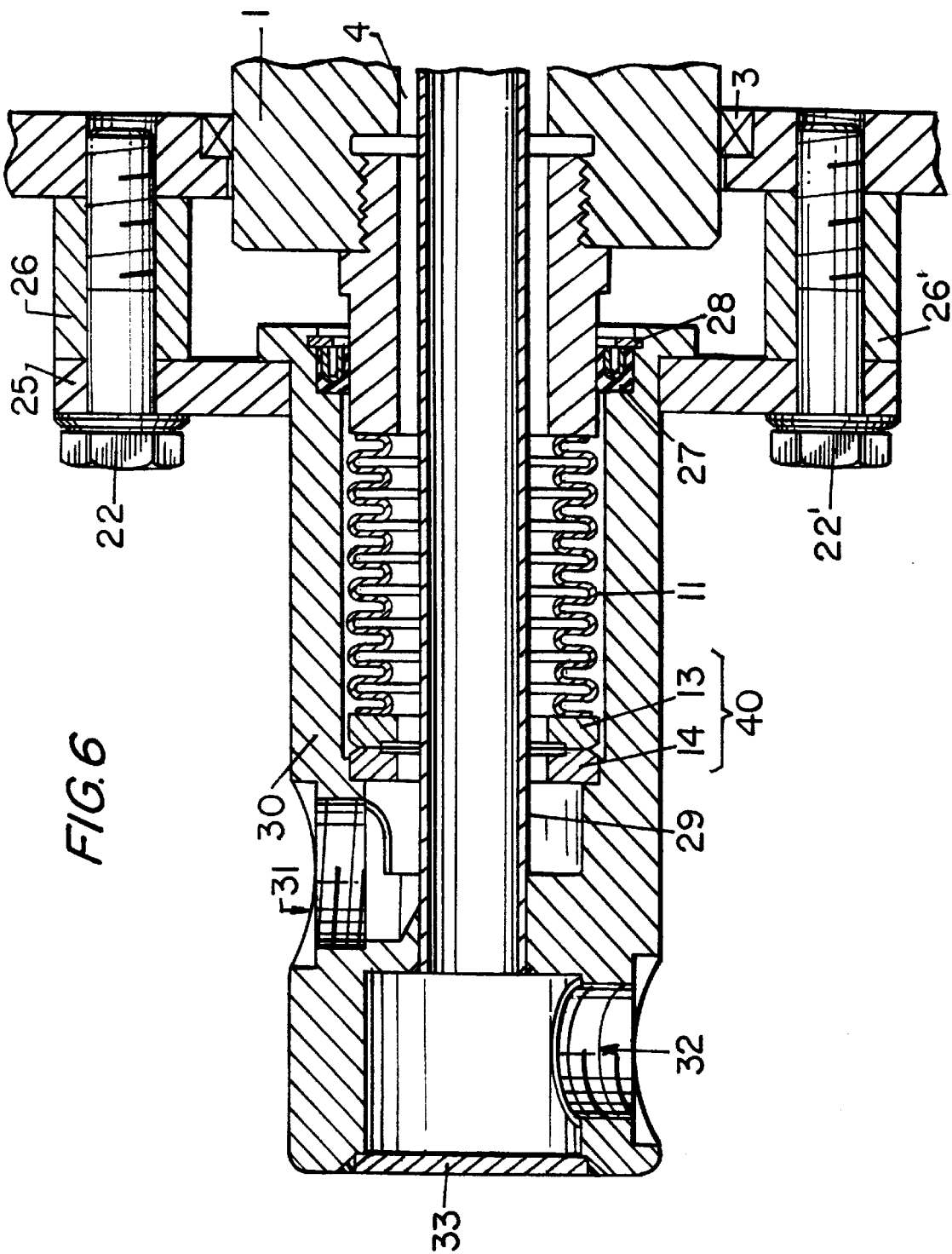
FIG. 6 shows a fourth embodiment form of the device according to the invention in longitudinal section comparable to FIG. 2.

FIG. 6 shows a second variant which is the counterpart of FIG. 3 in relation to FIG. 1 which also includes an inlet connection 31 and an outlet connection 32 in the receptacle sleeve 32. In this embodiment example also, the cover 20 is replaced by a plate 25 shaped like eyeglasses and spacer sleeves 26, 26'b cooperating therewith.

We claim:

1. A device for coupling a duct to a rotary element for conducting a liquid through said rotary element wherein said rotary element comprises journals which are receivable in bearings of a stationary part for supporting said rotary element, said device comprising:

a resilient hollow compensator having a first end and a second end arranged adjacent a bore hole in one of the journals of said rotary element such that said bore hole and said compensator comprise one continuous passage, said first end of said compensator being fixedly connected to said journal such that said compensator is rotatably fixed with respect to said rotating element;

a first sliding ring fixedly connected to the second end of said compensator;

a receptacle sleeve fixedly connected to the stationary part and enclosing said compensator, wherein said receptacle sleeve is connected to said duct and a distance between said receptacle sleeve and said stationary part is adjustable via spacer elements between said receptacle sleeve and said stationary part; and a second sliding ring fixedly connected to said receptacle for sealingly contacting said first sliding ring and pretensioning said compensator;

wherein said duct is connected to said bore hole in said journal via said receptacle sleeve, said first and second sealing rings, and said compensator and an amount of pretensioning applied to said compensator is variable in response to the adjustable distance of said receptacle sleeve from said stationary part.

2. The device of claim 1, wherein said receptacle sleeve comprises a neck portion at an end of said receptacle facing said stationary part and said device further comprises a flange fixedly connected by connecting elements to said stationary part and holding said neck portion of said receptacle sleeve.

3. The device of claim 2, wherein said spacer element comprise spacer sleeves which enclose connecting elements connecting the flange to the stationary part and said flange comprises a plate spaced from the stationary part by said spacer sleeves.

4. The device of claim 1, further comprising a collar sleeve fixedly connected between said first end of said compensator and said bore hole of said journal.

5. The device of claim 1, wherein said first and second sliding rings comprise a hard, wear-resistant material.

6. The device of claim 5, wherein said hard, wear-resistant material comprises silicon carbide.

7. The device of claim 1, wherein said receptacle comprises an inlet duct connection and an outlet duct connection and said device further comprises a pipe having a smaller diameter than said compensator and said bore hole, wherein said pipe connects one of said inlet duct connection and said outlet duct connection to said rotary element and a space surrounding said pipe in said receptacle is in communication with the other one of said inlet duct connection and said outlet duct connection.

8. The device of claim 4, further comprising a sealing ring sealingly connected between said receptacle and said collar sleeve.

9. The device of claim 1, wherein said receptacle comprises a flattened portion cooperating with said connection to said stationary portion for preventing rotation of said receptacle portion with said journal.

* * * * *